Aug. 27, 1968  D. J. QUICK  3,398,516
BASE CUTTER HEIGHT INDICATORS FOR CANE HARVESTERS
Filed Dec. 27, 1965
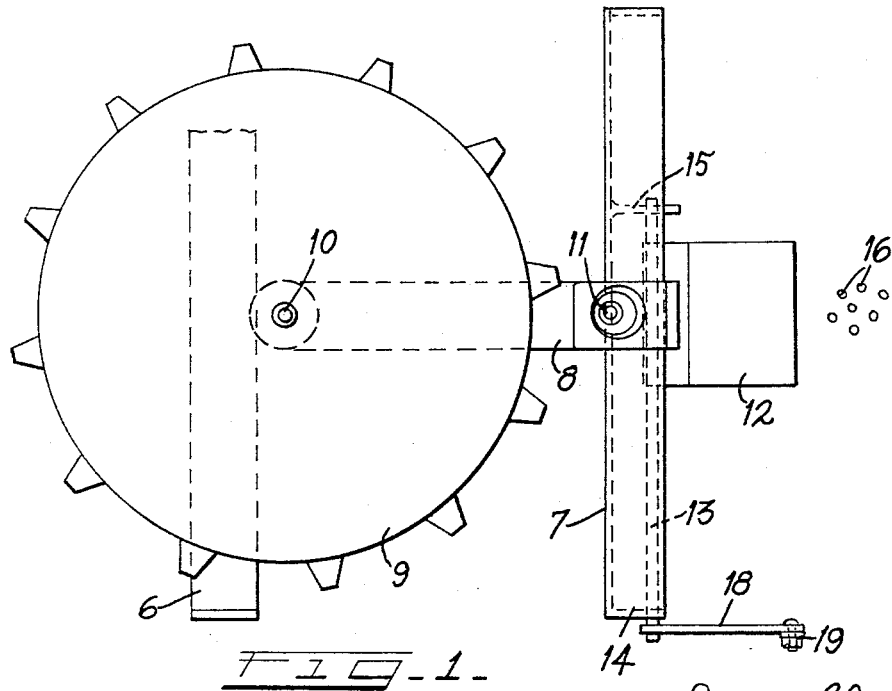
FIG. 1.
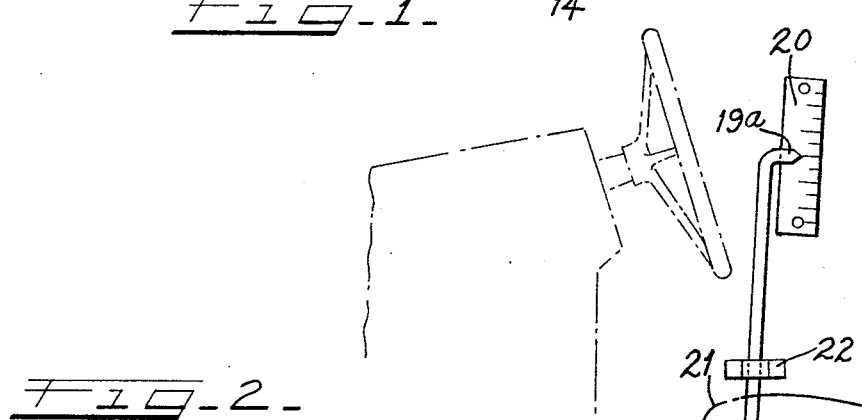
FIG. 2.
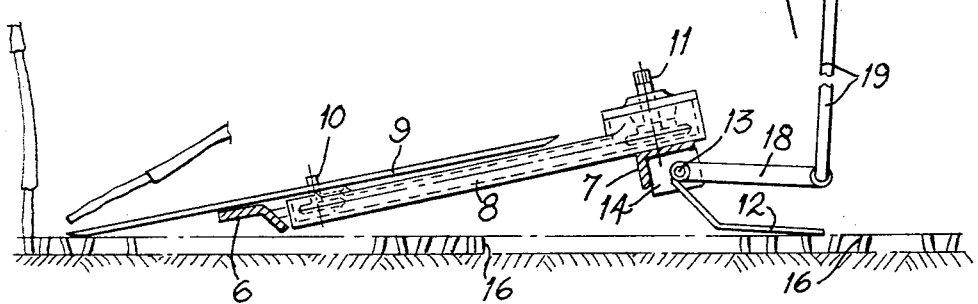
INVENTOR
DONALD J. QUICK
BY
ATT'Y.

United States Patent Office 3,398,516
Patented Aug. 27, 1968

3,398,516
BASE CUTTER HEIGHT INDICATORS FOR
CANE HARVESTERS
Donald Jonathan Quick, Manifold Heights, Geelong,
Victoria, Australia, assignor to International Harvester
Company, Chicago, Ill., a corporation of Delaware
Filed Dec. 27, 1965, Ser. No. 516,589
Claims priority, application Australia, Dec. 29, 1964,
53,421/64
4 Claims. (Cl. 56—208)

This invention relates to a base cutter height indicator for a cane harvester of the type comprising a base cutter arranged to cut the stalks of cane at the base as the harvester travels along a row of cane and movable relative to the harvester frame to adjust the height of the base cutter relative to the ground.

Because of the nature of cane fields and the layout of cane harvesters, it is difficult for the operator of the harvester to judge the height of harvesting operations. If the base cutter is allowed to shave the top of the ground, the knives or cutting edge of the cutter will wear rapidly. On the other hand, if the stalks of cane are cut a substantial distance above the ground, so as to leave a high stubble, the yield of the crop is decreased due to the sugar content in the stubble not being harvested.

It is, therefore, the principal object of the present invention to provide a base cutter height indicator for a cane harvester which will enable the operator of the harvester to determine the position of the base cutter relative to the ground under a variety of cropping conditions and thereby reduce the possibility of undue wear on the base cutter on the one hand and loss of sugar yield from the crop on the other hand.

A skid is pivotally connected to a frame supporting the base cutter for relative angular movement about a horizontal axis, and extends rearwardly from the pivot axis in a trailing ground engaging disposition. Angular movement of the skid is transmitted through a linkage positioned adjacent to the operator.

As the harvester proceeds along a row of cane the skid moves along the ground in the line of the row of cane and is caused to rise and fall as it passes over the clusters of cane stubble which are normally about thirty inches apart.

The amount of movement of the skid as it rises to pass over the stubble can be observed by the operator on the indicator scale which is conveniently graduated so that the operator can determine the height of the stubble above the ground.

The invention will be more readily understood from the following description of one practical arrangement of the height indicator as illustrated in the accompanying drawings.

In the drawings:
FIGURE 1 is a plan view of the base cutter and that portion of the harvester frame supporting the cutter; and
FIGURE 2 is a side elevation of the base cutter and its supporting frame shown in FIGURE 1.

Referring now to the drawings, a cutter frame formed of front and rear cross members 6 and 7 is connected to the cane harvester frame forming the support for a base cutter drive box 8 that lies along the longitudinal axis of the harvester. A vertically adjustable base cutter blade 9 is mounted on a shaft 10 journalled in the drive box 8 and is coupled by a chain and sprocket drive to a drive shaft 11, and a suitable drive transmission (not shown) connects the shaft 11 to the engine of the harvester.

The base cutter can be raised and lowered relative to the harvester frame by any suitable means to enable the height of the cutter above the ground to be adjusted as required during operation. The movement may be achieved by pivotally connecting the cutter frame to the main harvester frame and providing hydraulic power cylinders to control the angular relation therebetween.

A rectangular skid plate 12 is rigidly connected in a trailing relation to a cross shaft 13 extending transversely to the direction of travel of the harvester and journalled in bearings 14 and 15 secured to the rear cross member 7. The skid plate is symmetrical with respect to the longitudinal axis of the harvester and disposed slightly rearwardly of the rear extremity of the base cutter, so that it will be drawn over the stubble 16 remaining after the cane stalks have been cut by the base cutter 9. The skid plate 12 is made from sheet material and the free end portion of the skid lies in a generally horizontal plane below the pivot axis of the skid. This arrangement insures that the skid plate senses the actual height of the stubble within the sensing area.

Means are provided for transmitting the pivotal movement of skid plate 12 to an indicator that can be observed by the operator. These means include the cross shaft 13 to which the skid plate is secured and a lever arm 18 that is attached to one end of the cross shaft 13. A vertically extending pointer 19 is pivotally connected to the free end of lever arm 18. The vertically extending pointer 19 is supported in suitable guide 22 to permit free vertical movement thereof in response to the angular movement of the skid plate 12.

The upper end 19a of the pointer functions as an indicator that moves across an indicator scale 20 mounted on a portion of the harvester frame or bodywork adjacent to the operators seat, indicated diagrammatically at 21. The indicator scale 20 is mounted where it can be readily observed by the operator as harvesting is proceeding.

If the base cutter 9 is in contact with the ground, the stubble 16 will be the same height as the ground, and therefore no movement of the indicator 19a will occur and the operator will know that the base cutter should be raised to clear the ground. If the base cutter is above the level of the ground, the indicator 19a will be caused to move over the indicator scale 20 as the harvester progresses and the amount of movement indicates the height of the stubble.

It should be understood, of course, that the foregoing disclosure relates to only a preferred embodiment of the invention and that numerous modifications or alterations may be made therein without departing from the spirit and the scope of the invention.

What is claimed is:
1. A base cutter height indicator for a cane harvester of the type having a cutter frame supporting a vertically adjustable base cutter on the forward end thereof comprising: a skid pivotally mounted adjacent the rear end on the cutter frame, the free end of said skid adapted to trail the swath of the adjustable base cutter and to engage the stubble of the cut cane and the soil surface between stubble, an indicator scale mounted on the cane harvester for observation by the operator, an indicator mounted for movement across said indicator scale, and means connecting said pivotally mounted skid to said indicator such that pivotable movement of said skid will cause movement of the indicator over said indicator scale.

2. The invention as set forth in claim 1 wherein said skid is formed from sheet material and the free end of said skid lies in a generally horizontal plane below the pivot axis of said skid.

3. The invention as set forth in claim 1 wherein said means connecting said pivotally mounted skid to said indicator comprises: a cross shaft pivotally mounted on said cutter frame to which said skid is connected, a lever arm fixed to said cross shaft, and link means connecting the free end of said lever arm to said indicator.

4. The invention as set forth in claim 3 wherein the free end of said skid lies in a generally horizontal plane below said cross shaft.

References Cited

UNITED STATES PATENTS

| | | | |
|---|---|---|---|
| 8,840 | 3/1852 | Hamilton | 37—54 |
| 328,697 | 10/1885 | Marquis | 37—102 |
| 367,058 | 7/1887 | Pfleger | 172—240 |
| 2,170,573 | 8/1939 | Pierson | 56—208 |
| 2,178,265 | 10/1939 | Peterson | 37—63 |
| 2,528,041 | 10/1950 | Davis | 56—26 |
| 2,681,538 | 6/1954 | Flansaas | 56—23 |
| 2,875,568 | 3/1959 | Watamaker | 56—210 |

FOREIGN PATENTS 874,521  6/1953  Germany.

ALDRICH F. MEDBERY, *Primary Examiner.*